United States Patent Office 2,847,477
Patented Aug. 12, 1958

2,847,477
ALLYL ETHERS

Warren H. Watanabe, Philadelphia, Pa., and Lawrence E. Conlon, Esmond, R. I., assignors to Rohm & Haas Company, Philadelphia, Pa., a corporation of Delaware No Drawing. Application August 13, 1956
Serial No. 603,814

11 Claims. (Cl. 260—611)

This invention deals with a method for preparing allyl ethers of aliphatic, arylaliphatic, or cycloaliphatic alcohols. This method comprises reacting allyl alcohol with a said alcohol under the influence of a catalyst of mercury and a strong acid which is ionizable and soluble in the reaction system.

Various allyl ethers have been reported in the chemical literature. They have been prepared in many instance through the Williamson reaction or modifications thereof. Low yields of allyl ethers were reported to be made from allyl alcohol and lower alkanols and the like under the influence of a catalyst comprising cuprous chloride, ammonium chloride, hydrochloric acid, copper, and water. The various prior art methods have not proved to be attractive or efficient and the various individual methods have not been generally applicable to the preparation of a range of allyl ethers.

Yet it would be desirable to have more effective and generally applicable methods for the preparation of allyl ethers in order to provide these ethers for use as solvents, plasticizers, and chemical intermediates. As the latter, they may be used in forming polymers, particularly copolymers, or for forming glycidyl ethers, which may be used in forming valuable resins.

In our method dehydroetherification is effected by bringing together allyl alcohol and an alcohol ROH, where R is alkyl, alkenyl, cycloalkyl, aralkyl, or such group having an inert substituent, including in particular one or more ether groups, and reacting the allyl alcohol and said other alcohol under the influence of a catalyst composed of a salt of mercury and a strong acid which is soluble and ionizable in the reaction system.

While reaction begins at temperatures as low as 25° C. and may be effected up to 150° C., it is generally most convenient to operate between 75° and 125° C. and a range of 85° to 100° C. is preferred. The reaction is usually carried out at atmospheric pressure but it may also be carried out at reduced or increased pressure.

Usually the alcohols themselves act as solvents, but where because of the nature of the alcohol or a desire to operate at a given temperature, or as a matter of convenience, it may be useful to use an inert organic solvent such as a naphtha, benzene, toluene, xylene, or other volatile hydrocarbon solvent, chloroform, ethylene dichloride, carbon tetrachloride, or other volatile chlorinated solvent, or simple ether, such as isopropyl or butyl ether. The solvent is selected so as to be readily separable from the reaction product. A solvent is often useful to assist in removal of water.

The catalytic effectiveness of a considerable variety of mercury salts has been studied. The effectiveness of salts depends both upon the constituents and the form of the salt. Thus, mercury sulfate when finely ground acts as a catalyst, although this compound in the form of crystals as manufactured does not give sufficiently rapid action. Mercury sulfate as prepared by treating a mercury salt of a weak acid, such as mercury acetate or mercury benzoate, with sulfuric acid gives an effective and rapid-acting catalyst. The amount of sulfuric acid may be from about 10% to over 150% equivalent to the mercury salt. Likewise, a mercury salt of a carboxylic acid, such as the above, may be treated with a similar proportion of hydrofluoric acid or an "ansolvo acid" formed from boron trifluoride and an oxygenated organic compound.

As is known, boron trifluoride forms complexes with oxygen-containing organic compounds, including carboxylic acids, esters, ketones, aldehydes, alcohols, and ethers. These complexes in conjunction with a soluble mercury salt provide highly effective catalyst systems. The complex may be one such as $BF_3 \cdot (C_2H_5)_2O$ or $BF_3 \cdot (C_4H_9)_2O$ as formed by mixing boron trifluoride with one of the indicated ethers or other ether, or $BF_3 \cdot 2CH_3COOH$ or $BF_3 \cdot 2C_2H_5COOH$ as formed with a carboxylic acid, or $BF_3 \cdot 2C_2H_5OH$ or $BF_3 \cdot 2C_4H_9OH$ as formed with typical alcohols, or $BF_3 \cdot CH_3COCH_3$ or $BF_3 \cdot CH_3COC_2H_5$ as formed with typical ketones, or in general $BF_3 \cdot M_x$, where M represents an oxygenated organic compound, preferably of not over about twelve carbon atoms and $x$ represents the number of moles of such compound coordinated with one mole of $BF_3$, usually one or two. Of course, excess of the organic compound is permissible and may serve as a solvent. It may be further commented that boron trifluoride itself may be added directly to the reaction mixture and the coordinated complex there formed, as there are, of course, alcohols and ethers present.

In place of addition of a strong acid to a soluble salt there may be added an acidic salt of a strong acid, for example, ferrous ammonium sulfate or ferrous sulfate and sulfuric acid, or silver nitrate. The catalyst formed by mixing mercury acetate or benzoate and silver nitrate has proved to be quite effective. In place of the mercury salt used above there may be mixed mercuric oxide and a strong acid, such as sulfuric acid, hydrofluoric acid, a coordinated complex of boron trifluoride or boron trifluoride itself, which forms a coordinated complex with components of the reaction mixture. In fact any boron trifluoride coordinated complex can be used.

The strong acids, including the ansolvo acids mentioned above, do not by themselves provide the necessary catalytic action. Similarly, the mercury carboxylates or mercury oxide by themselves fail to promote the reaction. This is also true of mercury phosphate which is insoluble in the reaction system or mercury bromide or chloride which appear insoluble or at least unionized in the mixture.

There are needed only relatively small amounts of mercury compound and strong acid for promotion of the desired dehydroetherification. Thus, there may be used from about 0.5 to about five mole percent of mercury compound per mole of allyl alcohol. A larger proportion may be added, if so desired, particularly when multiple additions of mercury catalyst (including strong acid) are made. This procedure is often highly advantageous, as it has been observed that the extent of conversion often depends upon having active catalyst present in the reaction mixture rather than upon some equilibrium and the catalyst may be deactivated as reaction proceeds.

The alcohols which are etherified with allyl alcohol include allyl alcohol itself to form diallyl ether and alkanols generally from methyl through butyl, octyl, and dodecyl to and beyond octadecyl alcohols. Primary and secondary alcohols react best and tertiary alcohols respond, but poorly, as is also true for phenols. Alkenols react like alkanols and in addition to allyl alcohol there can be used crotyl, 3-butenyl, 4-pentenyl, 5-hexenyl, 10-undecenyl, or oleyl and similar primary and secondary alkenols. Cycloaliphatic alcohols are also reactive in the described system and there may be used cyclopentyl, cyclohexyl, methylcyclohexyl, hexahydrobenzyl, dicyclopentanyl, or terpenyl alcohols with moderately good yields of the corresponding allyl cycloalkyl ethers. The aralkyl derivatives are readily prepared by reaction of allyl alcohol and benzyl alcohol, methylbenzyl alcohol, butylbenzyl alcohol, phenylethanol, and the like.

Alcohols like the above but containing an ether linkage or linkages may likewise be used. There may thus be used methoxyethanol, ethoxyethanol, ethoxypropanol, butoxyethanol, dodecyloxyethanol, ethoxyethoxyethanol, dodecyloxyethoxyethanol, phenoxyethanol, phenoxyethoxyethanol, octylphenoxyethanol, octylphenoxypolyethoxyethanol, benzoxyethanol, cyclohexoxyethanol, and so on. The polyethoxyethanols having a terminal hydrocarbon group of sufficient size to impart a hydrophobic balance, as octylphenyl, or dodecyl, provide a most interesting group of products when there is introduced a terminal allyl ether group and which, although of good surface-activity, do not cause objectionable foam in aqueous solutions. Thus, alkylphenoxypolyethoxyethanols having three to twenty-two carbon atoms in the hydrophobic portion and five to one hundred ether groups can be reacted to introduce a terminal allyl group.

Details of typical procedures are given in the examples which follow and which are presented for purposes of illustration and not by way of limitation. Parts are by weight unless otherwise designated.

*Example 1*

There are mixed 58 parts of allyl alcohol, 65 parts of methanol, 7.66 parts of mercuric acetate (2.4 mole percent based on the allyl alcohol), and 2.00 parts of concentrated sulfuric acid (equivalent to 85% of the mercury). The mixture is heated at full reflux for an hour and then the mixture is subjected to fractional distillation. The fraction taken at 42.5°–43° C. corresponds in composition to 94% pure allyl methyl ether in an amount of 71.5 parts. It has refractive index values, $n_D^{20}$, of 1.3765 and, $n_D^{25}$ of 1.3738. Further fractionation gives 24 parts of methanol and almost a quantitative yield of water.

The fraction of ether is purified by treating it with a few parts of phosphoric anhydride at room temperature, decanting the organic liquid, and fractionally distilling it. Pure allyl methyl ether is thus obtained distilling at 42°–42.3° C., giving an index of refraction, $n_D^{25}$, of 1.3759 and a density, $d_4^{25}$, of 0.7568. By analysis it contains 66.71% of carbon and 11.22% of hydrogen (theory 66.63% and 11.18% respectively).

*Example 2*

A mixture of 130.5 parts of allyl alcohol, 148 parts of n-butanol, 8.5 parts of mercuric acetate (1.2 mole percent on allyl alcohol), and 3.0 parts of boron trifluoride-ethyl ether complex containing 20% of boron trifluoride is heated under reflux for 1.5 hours with separation of water in a trap. The amount of water separated amounts to 28.5 parts, equivalent to 70% conversion. The reaction mixture is cooled, treated with an additional 8.5 parts of mercuric acetate, and again heated under reflux with trapping of water for another 1.5 hours. At this time a total of 38 parts of water has been collected, corresponding to 94% of theory. The pot residue is flash-distilled by heating it under low pressure with the receiver chilled with Dry Ice and acetone. The maximum pot temperature is carried to about 50° C. at 0.1 mm. The flash-off product is washed with water, with aqueous 5% sodium hydroxide solution, and with saturated sodium chloride solution. It is dried over potassium carbonate and fractionally distilled to give fractions as follows: Cut I up to 86° C., four parts containing some diethyl ether; Cut II 86°–91° C., six parts, allyl alcohol-diallyl ether azeotrope; Cut III 91°–97.5° C., 15 parts allyl alcohol; Cut IV 97.5°–109.5° C., 10.5 parts, allyl alcohol; Cut V 109.5°–112° C., 43 parts, 74.2% butyl allyl ether-25.8% butanol azeotrope; Cut VI 112°–117° C., 140.5 parts butyl allyl ether anlyzing as 95% pure allyl butyl ether by bromine number by the bromate-bromide method and 100% pure with pyridine sulfate dibromide; and residue 15.5 parts. Cut VI contains by analysis 73.33% of carbon and 12.39% of hydrogen.

Part of Cut VI is refluxed with benzene and boric acid with separation of water. The mixture is distilled and pure allyl butyl ether obtained at 64°–65° C./120 mm. having a refractive index, $n_D^{25}$, of 1.4029 and a density, $d_4^{25}$, of 0.7794, and containing by analysis 77.35% of carbon and 12.45% of hydrogen (theory 77.63% and 12.37% respectively).

The same general procedure can be applied to any other alkanol with formation of the corresponding allyl alkyl ether. The method is quite as applicable to octyl, decyl, or dodecyl alcohol or cetyl or stearyl alcohol or other alkanol.

*Example 3*

There are mixed 136.4 parts of n-octadecyl alcohol, 85 parts of benzene, and 38 parts of allyl alcohol. In the resulting solution there are dissolved in order 0.75 part of a 45% solution of boron trifluoride in diethyl ether and 2.0 parts of mercuric acetate. This reaction mixture is heated under reflux with separation of water in a trap. After removal of 8.5 parts of water the reaction mixture is cooled and additional charges of 0.75 part of $BF_3$-etherate and 2.0 parts of mercuric acetate are made. Heating under reflux is resumed and continued until water is no longer evolved. Volatile material is then removed by heating to 100° C. at 0.15 mm. The residue is distilled through a Claisen head, giving 119.4 parts of distillate at 143°–150° C./0.1 mm. The distillate is a mixture of about 60% allyl octadecyl ether and octadecyl alcohol.

The distillate is purified by heating it in 86 parts of benzene with 4.7 parts of boric acid to convert alcohol to borate ester. Water is removed by azeotropic distillation. From the resulting mixture there is distillated at 146°–153° C./0.15–0.20 mm. pure allyl octadecyl ether amounting to 73 parts. It melts at 26°–27° C. and contains by analysis 81.10% of carbon and 13.62% of hydrogen (theory 81.21% and 13.63% respectively).

In the same way there are reacted allyl alcohol and octadecenyl alcohol to give allyl octadecenyl ether as an oil, distilling at about 205°–215° C./15 mm. Likewise, allyl alcohol and 5-pentenol give allyl 5-pentenyl ether, distilling at 135°–140° C., allyl alcohol and 3-methyl-3-butenol give allyl 3-methyl-3-butenyl ether, distilling at 132°–136° C., while dodecenyl alcohol (5,5,7,7-tetramethyl-2-octenyl alcohol) and allyl alcohol give allyl dodecenyl ether, distilling at 118°–122° C./5 mm.

Other alkenols may likewise be used in substantially the same way and thus the series of allyl alkenyl ethers can be prepared including diallyl ether.

*Example 4*

A solution is prepared of 1.5 parts of $BF_3(C_2H_5)_2O$ (45% $BF_3$) and four parts of mercuric acetate in 116 parts of allyl alcohol and 68 parts of n-hexane. It is heated under reflux with continuous separation of water. Over a five hour period of refluxing a total of 24 parts of water is separated. The reaction mixture is cooled and 10 parts of boric acid added. This mixture is heated to reflux for 3.5 hours, when evolution of water ceases. The mixture is flash-distilled under low pressure into a solid carbon dioxide chilled receiver with a maximum pot temperature of 12° C. The flash-distillate is fractionally distilled at atmospheric pressure to give 45.2 parts of pure diallyl ether, distilling at 94°–94.8° C. It contains by analysis 73.43% of carbon and 10.13% of hydrogen (theory 73.43% and 10.27% respectively) and has a refractive index, $n_D^{25}$, of 1.4134 and a density, $d_4^{25}$, of 0.8027.

In place of an aliphatic alcohol there may be reacted a cycloaliphatic alcohol with an entirely comparable formation of allyl cycloalkyl or cycloalkenyl ethers.

*Example 5*

A mixture of 99 parts of cyclohexanol, 70 parts of allyl alcohol, 57 parts of benzene, two parts of a 45% boron fluoride solution in dibutyl ether, and 4.6 parts of mercuric acetate is heated under reflux with separation of water in a trap. After about one hour of refluxing another two part portion of the boron trifluoride-etherate is added with four parts of mercuric acetate. Azeotropic distillation is continued until water is no longer evolved. This requires about two more hours.

The reaction mixture is flash-distilled at 0.1 mm. with a maximum pot temperature of 85° C. into a carbon dioxide ice-acetone cooled receiver. The distillate is washed four times with 50 part portions of water. The washed distillate is dried over calcium sulfate, filtered, and fractionally distilled. At 81°–89° C./36–37 mm. there is obtained a fraction of 86.2 parts of 84% pure allyl cyclohexyl ether, the balance being cyclohexanol. This fraction is reacted as above with boric acid and the desired ether is fractionally distilled. At 81°–83.5° C./38–39 mm. there is obtained a fraction of 58.3 parts of allyl cyclohexyl ether, containing by analysis 76.51% of carbon and 11.49% of hydrogen (theory 77.09% and 11.50% respectively), having a refractive index, $n_D^{25}$, of 1.4483 and a density, $d_4^{25}$, of 0.8830.

Aralkanols are quite as susceptible to the process of this invention as the aliphatic and cycloaliphatic alcohols, illustrations of which are given in the above examples.

*Example 6*

A solution is prepared from 108 parts of benzyl alcohol, 70 parts of allyl alcohol, and 61 parts of benzene to which is added 1.5 parts of a boron trifluoride-diethyl ether complex with a boron trifluoride content of 45% and four parts of mercuric acetate. The solution is heated under reflux with continuous separation of water. After 14 parts of water have been removed, the reaction mixture is cooled and treated with an additional 1.5 parts of BF₃-etherate and four parts of mercuric acetate. Heating under reflux is resumed and continued until water is no longer evolved. The reaction mixture is flash-distilled at 0.2 mm. with a maximum pot temperature of 92° C. into a "Dry-Ice" chilled receiver. The flash-distillate is fractionally distilled to give at 70°–75° C./5 mm. 103 parts of product which by bromine number contains 93% of allyl benzyl ether, the remainder being benzyl alcohol.

The benzyl alcohol is removed as above by reaction with boric acid to form the borate. There is distilled off 75.5 parts of pure allyl benzyl ether, coming over at 71°–71.5° C./5 mm., having a refractive index, $n_D^{25}$, of 1.5052 and a density, $d_4^{25}$, of 0.9548 and containing by analysis 81.43% of carbon and 8.60% of hydrogen (theory 81.04% and 8.16% respectively).

The same method may be used with phenylethanol or with cinnamyl alcohol to give allyl ethers. Allyl cinnamyl ether distils at 142°–148° C./14 mm.

It may be mentioned that procedures such as have been described were followed with use of various other catalyst combinations. Results were essentially like those already reported with preparation of the various allyl ethers. For example, with finely ground mercuric sulfate 102% of the theoretical water was separated in eight hours. With a mixture of mercuric acetate, ferric sulfate, and boron trifluoride, 98% of the theoretical water was separated within two hours. With mercuric acetate and hydrofluoric acid over 100% of the theoretical water was collected within six hours, the HF being supplied from a 48% solution. From mercuric acetate and BF₃ supplied from a 20% diethyl ether complex there was obtained 102% of the theoretical water while with a similar catalyst made from an equivalent proportion of mercuric oxide for the acetate 103% of the theoretical water was separated in 3.5 hours.

The catalysts from a soluble mercury salt and boron trifluoride or hydrofluoric acid are generally preferred, because they do not cause oxidation or discoloration. There is some tendency for these side effects when sulfuric acid is used. They can be lessened by use of strong sulfonic acids, which also act in much the same way otherwise as sulfuric.

The method here described is highly advantageous and is widely applicable to preparation of allyl ethers from a great variety of non-tertiary alcohols with wide ranges in type and size, as has been shown.

We claim:

1. A process for preparing allyl ethers which comprises reacting allyl alcohol with a non-tertiary alcohol, other than an alkanol having less than three carbon atoms and alkynols, in the temperature range of about 25° to 150° C. in the presence of a catalyst that is soluble and ionizable in the reaction system, said catalyst consisting of a soluble mercury salt and a strong acid-acting agent.

2. A process for preparing allyl ethers which comprises reacting allyl alcohol with a non-tertiary alcohol, other than an alkenol having less than three carbon atoms and alkynols, in the temperature range of about 75° to 125° C. in the presence of a catalyst that is soluble and ionizable in the reaction system, said catalyst consisting of a soluble mercury salt and a strong acid-acting agent from the class consisting of sulfuric acid, hydrofluoric acid, boron trifluoride, and boron trifluoride coordinated complexes.

3. A process for preparing allyl ethers which comprises reacting allyl alcohol with a non-tertiary alcohol, other than an alkenol having less than three carbon atoms and alkynols, at the reflux temperature with separation of water formed in the presence of a catalyst that is soluble and ionizable in the reaction system, said catalyst consisting of a soluble mercury salt and a strong acid-acting agent.

4. A process for preparing allyl ethers which comprises reacting allyl alcohol with a non-tertiary alcohol in the temperature range of about 25° to 150° C. in the presence of a catalyst that is soluble and ionizable in the reaction system, said catalyst consisting of a soluble mercury salt and a strong acid-acting agent, said non-tertiary alcohol being selected from the group consisting of alkanols, alkenols having at least three carbon atoms, cycloalkanols, alkylcycloalkanols, dicycloalkanols, terpenols, arylalkanols, alkylarylalkanols, alkoxyalkanols, aryloxyalkanols, alkylaryloxyalkanols, and alkylarylpolyethoxyalkanols.

5. A process for preparing allyl ethers which comprises reacting allyl alcohol with a non-tertiary alcohol in the temperature range of about 75° to 125° C. in the presence of a catalyst that is soluble and ionizable in the reaction system, said catalyst consisting of a soluble mercury salt and a strong acid-acting agent from the class consisting of sulfuric acid, hydrofluoric acid, boron trifluoride, and boron trifluoride coordinated complexes, said non-tertiary alcohol being selected from the group consisting of alkanols, alkenols having at least three carbon atoms, cycloalkanols, alkylcycloalkanols, dicycloalkanols, terpenols, arylalkanols, alkylarylalkanols, alkoxyalkanols, aryloxyalkanols, alkylaryloxyalkanols, and alkylarylpolyethoxyalkanols.

6. A process for preparing allyl ethers which comprises reacting allyl alcohol with a non-tertiary alcohol at the reflux temperature with separation of water formed from the class consisting of sulfuric acid, hydrofluoric acid, boron trifluoride, and boron trifluoride coordinated complexes, said non-tertiary alcohol being selected from the group consisting of alkanols, alkenols having at least three carbon atoms, cycloalkanols, alkylcycloalkanols, dicycloalkanols, terpenols, arylalkanols, alkylarylalkanols, alkoxyalkanols, aryloxyalkanols, alkylaryloxyalkanols, and alkylarylpolyethoxyalkanols.

7. The process of claim 6 in which the non-tertiary alcohol is methanol.

8. The process of claim 6 in which the non-tertiary alcohol is n-butanol.

9. The process of claim 6 in which the non-tertiary alcohol is n-octadecanol.

10. The process of claim 6 in which the non-tertiary alcohol is cyclohexyl alcohol.

11. The process of claim 6 in which the non-tertiary alcohol is benzyl alcohol.

References Cited in the file of this patent

Booth et al.: Boron Trifluoride, pp. 170 and 195 (1949), John Wiley, publisher.

Groggins: Unit processes in Organic Synthesis, 4th ed. (1952), p. 814, publisher: McGraw-Hill.

UNITED STATES PATENT OFFICE
CERTIFICATE OF CORRECTION

Patent No. 2,847,477                                                 August 12, 1958

Warren H. Watanabe et al.

It is hereby certified that error appears in the printed specification of the above numbered patent requiring correction and that the said Letters Patent should read as corrected below.

Column 6, line 17, for "alkanol" read -- alkenol --.

Signed and sealed this 21st day of October 1958.

(SEAL)
Attest:

KARL H. AXLINE
Attesting Officer

ROBERT C. WATSON
Commissioner of Patents